US009852103B2

(12) United States Patent
Yi et al.

(10) Patent No.: US 9,852,103 B2
(45) Date of Patent: Dec. 26, 2017

(54) BIDIRECTIONAL TRANSMISSION OF USB DATA USING AUDIO/VIDEO DATA CHANNEL

(71) Applicant: Lattice Semiconductor Corporation, Portland, OR (US)

(72) Inventors: Ju Hwan Yi, Sunnyvale, CA (US);
Young Il Kim, Sunnyvale, CA (US);
Gijung Ahn, San Jose, CA (US);
Min-Kyu Kim, Sunnyvale, CA (US);
Daeyun Shim, Saratoga, CA (US);
Gyudong Kim, Sunnyvale, CA (US);
Hoon Choi, Mountain View, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 249 days.

(21) Appl. No.: 14/681,992

(22) Filed: Apr. 8, 2015

(65) Prior Publication Data
US 2015/0293879 A1    Oct. 15, 2015

Related U.S. Application Data

(60) Provisional application No. 61/979,483, filed on Apr. 14, 2014.

(51) Int. Cl.
*G06F 13/14* (2006.01)
*G06F 13/42* (2006.01)
(Continued)

(52) U.S. Cl.
CPC ............ *G06F 13/4278* (2013.01); *G06F 3/14* (2013.01); *G06F 13/4068* (2013.01);
(Continued)

(58) Field of Classification Search
CPC .............. G09G 5/006; G09G 2370/04; G09G 2370/047; G09G 2370/10; G09G 13/4068; G06F 3/14
See application file for complete search history.

(56) References Cited

U.S. PATENT DOCUMENTS

| 6,564,269 B1 | 5/2003 | Martin |
| 2007/0201492 A1* | 8/2007 | Kobayashi ................ G06F 3/14 370/395.64 |

(Continued)

OTHER PUBLICATIONS

PCT International Search Report, PCT Application No. PCT/US2015/024984, dated Jul. 24, 2015, 11 pages.

*Primary Examiner* — Ernest Unelus
(74) *Attorney, Agent, or Firm* — Fenwick & West LLP (57) ABSTRACT

Embodiments relate to half-duplex bidirectional transmission of data compliant with a first standard (e.g., Universal Serial Bus (USB) standard) over a physical channel of a multimedia link for transmitting audio/video ("A/V") data compliant with a second standard (e.g., Mobile High-Definition Link (MHL) standard) between a source device and a sink device using time division multiplexing (TDM). The source device sends units of data including A/V data and forward data compliant with the first standard at first times whereas the sink device sends units of data including backward data compliant with the first standard at second times between transmissions from the source device. The first times do not overlap with the second times. Synchronization signals may be added to the first and second units of data to align character symbols embedded in the first and second units of data.

22 Claims, 6 Drawing Sheets

(51) Int. Cl.
*G06F 13/40* (2006.01)
*G09G 5/00* (2006.01)
*G06F 3/14* (2006.01)

(52) U.S. Cl.
CPC ......... *G09G 5/006* (2013.01); *G09G 2370/04* (2013.01); *G09G 2370/047* (2013.01); *G09G 2370/10* (2013.01)

(56) References Cited

U.S. PATENT DOCUMENTS

| | | | |
|---|---|---|---|
| 2009/0245345 A1 | 10/2009 | Lee et al. | |
| 2009/0257367 A1 | 10/2009 | Keppler et al. | |
| 2013/0223293 A1 | 8/2013 | Jones et al. | |
| 2013/0335430 A1* | 12/2013 | Douglas | G09G 5/006 345/520 |
| 2013/0336334 A1* | 12/2013 | Gilbert | H04J 3/16 370/458 |
| 2014/0016034 A1 | 1/2014 | Cirstea | |

* cited by examiner

BIDIRECTIONAL TRANSMISSION OF USB DATA USING AUDIO/VIDEO DATA CHANNEL

CROSS-REFERENCE TO RELATED APPLICATION

This application claims priority under 35 U.S.C. §119(e) to U.S. Provisional Patent Application No. 61/979,483 filed on Apr. 14, 2014, which is incorporated by reference herein in its entirety.

BACKGROUND

Field of Art

This disclosure generally relates to data transmission, and, more particularly, to bidirectional transmission of Universal Serial Bus (USB) data using an Audio/Video (A/V) channel.

Background

High-Definition Multimedia Interface (HDMI) and Mobile High-Definition Link (MHL) were designed to transfer uncompressed video and audio content from source devices to sink devices. The uncompressed video provides high video quality as long as the link (e.g., Transition Minimized Differential Signaling (TMDS) micro-USB) can support the full bandwidth and latency needed. Recent changes in popular display technology have made it desirable to transmit HDMI or MHL data over USB enabled devices.

However, it is difficult to simultaneously transfer high resolution HDMI or MHL videos and USB data over USB links due to different bandwidth and latency requirements and limitations associated with USB, HDMI and MHL standards. Bandwidth for audio/video transmission becomes restrictive when USB data is transmitted along the same link. USB data requires narrow latency constraints while audio/video is latency insensitive. Digital video standards, such as HDMI and MHL do not provide synchronous mechanisms for bidirectional USB data exchange between a source device and a sink device.

Additionally, transmitting both A/V and USB over an auxiliary bus of a USB link does not meet the speed requirements of A/V or USB standards. Further, the requirements necessary for high speed transmission of HDMI or MHL across the auxiliary bus leaves the data susceptible to electro-magnetic interference and thus data corruption.

SUMMARY

Embodiments of the present disclosure are related to a source device and sink device for bidirectional transmission of USB data over an Audio/Video channel of a multimedia link. A source device sends a first unit of data to a sink device over a first physical channel of the multimedia link during a first time. The first unit of data is comprised of A/V data, and forward data that is compliant with USB standard. The source device can receive a second unit of data from the sink device over the physical channel of the multimedia link during a second time. The second unit of data includes backward data compliant with the USB standard. Additionally, the source device can send control data to the receiving sink device over a second physical channel of the multimedia link distinct from the first physical channel. The source device can also receive control data sent from the sink device over the second physical channel of the multimedia link.

The source device sends a first synchronization signal of a first length after sending the first unit of data and before sending a third unit of data from the source device. The source device also sends a second synchronization signal of a second length longer than the first synchronization to initialize communication over the first physical channel before sending the first unit of data. Additionally, the source device detects a first synchronization signal of a first length for a predetermined amount of time after sending the first unit of data. The predetermined amount of time is tracked at the source device. A predetermined amount of forward data is buffered before assembling and sending the first unit of data. The first synchronization signal is received at the source device before receiving the second unit of data. The first synchronization signal is used to align symbol boundaries for the second unit of data.

The first time and the second time are separated by at least a predetermined amount of turnover time (ToT) greater than a sum of a turn-off time of a driver of the source device for communicating over the first physical channel, a turn-on time of a driver of the sink device for communicating over the first physical channel, and a channel delay time. The predetermined amount of time is tracked at the source device. Further, the source device sends another first synchronization signal of a the first length from the source device to the sink device after receiving the second unit of data and before sending a third unit of data from the source device to the second data, the third unit of data is compliant with the USB standard.

A sink device receives a first unit of data to over a first physical channel of the multimedia link during a first time. The first unit of data includes A/V data, and forward data that is compliant with USB standard. The sink device can send a second unit of data to the source device over the physical channel of the multimedia link during a second time. The second unit of data includes backward data compliant with the USB standard. Additionally, the sink device can receive control data from the transmitting source device over a second physical channel of the multimedia link distinct from the first physical channel. The sink device can also send control data sent to the source device over the second physical channel of the multimedia link.

BRIEF DESCRIPTION OF DRAWINGS

The disclosed embodiments have other advantages and features which will be more readily apparent from the detailed description, the appended claims, and the accompanying figures (or drawings).

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality.

Embodiments relate to half-duplex bidirectional transmission of data compliant with a first standard (e.g., Universal Serial Bus (USB) standard) over a physical channel of a multimedia link for transmitting audio/video ("A/V") data compliant with a second standard (e.g., Mobile High-Definition Link (MHL) standard) between a source device and a sink device using time division multiplexing (TDM). The source device sends units of data including A/V data and forward data compliant with the first standard at first times whereas the sink device sends units of data including backward data compliant with the first standard at second times between transmissions from the source device. The first times do not overlap with the second times. Synchronization signals may be added to the first and second units of data to align character symbols embedded in the first and second units of data. In order to distribute slower bitrate USB data through faster TDM time slots, USB data is buffered prior to transmission within the units of data.

As described herein, a "unit of data" refers to a set of data having a defined number of bits. The number of bits may be fixed (e.g., 32 bits) or variable within a predetermined ranges (e.g., 5 bits to 34 bits). The unit of data may be a packet of data.

The term "forward" and "backward" described herein refer to the direction of data packet transmission. "Forward" refers to a direction of data transmitted from the source device to the sink device whereas "backward" refers to the direction of signals transmitted from the sink device to the source device.

System for Multiplexing of USB Data in A/V Stream

Figure 1:
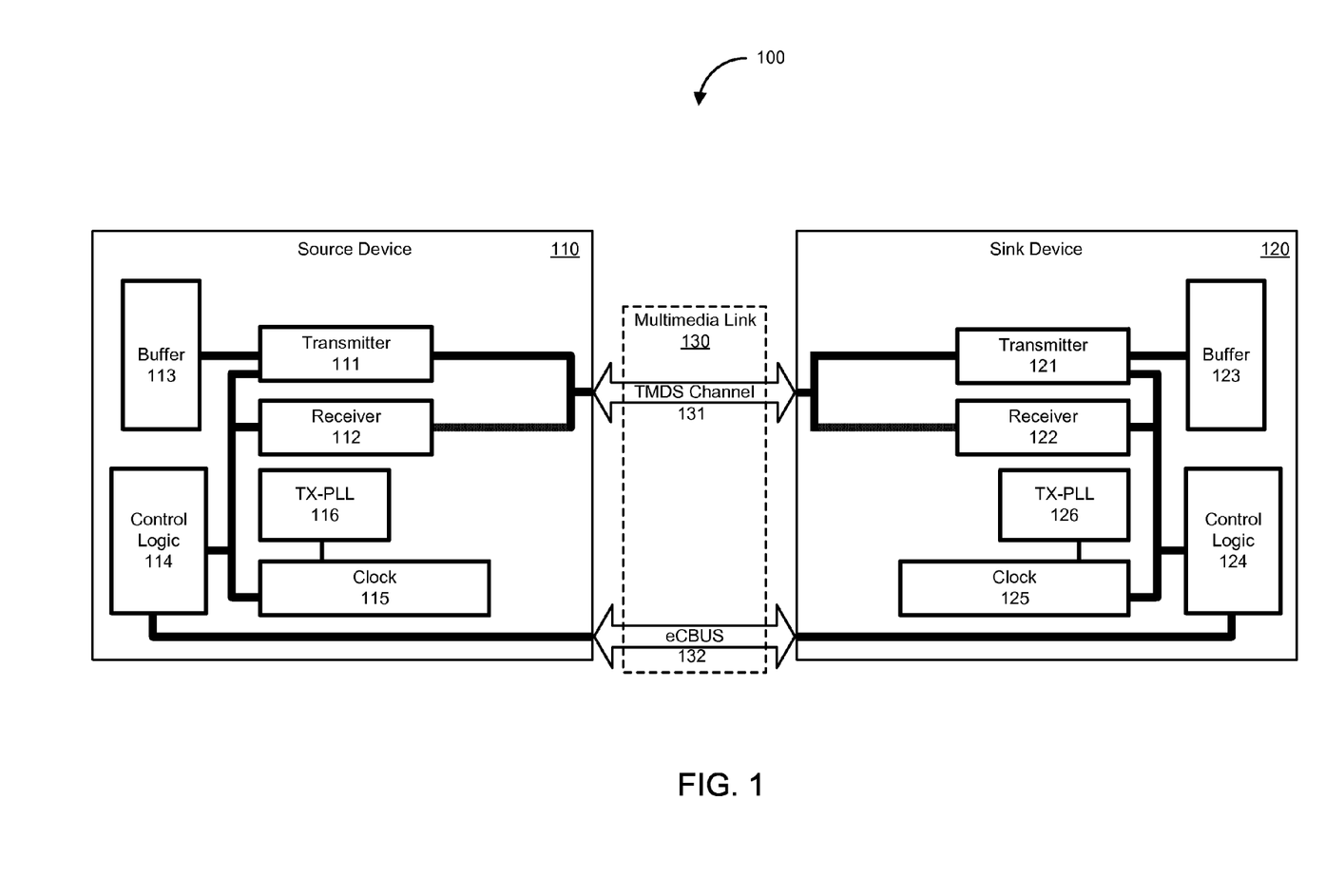
FIG. 1 is a block diagram illustrating a system including a source device, a sink device, and a multimedia link connecting the two devices, according to one embodiment.

FIG. 1 is a block diagram illustrating a system 100 including a source device 110, a sink device 120, and a multimedia link 130 connecting the two devices, according to one embodiment. For the sake of explanation, the following embodiments are explained with reference to a modified version of Mobile High-Definition Link (MHL) as the multimedia link 130. However, the same principle can be applied to other standards such as High-Definition Multimedia Interface (HDMI) standard, a Digital Visual Interface (DVI) standard, and a DisplayPort standard.

The multimedia link 130 includes both a TMDS channel 131 and an eCBUS 132. The multimedia link 130 is different from links compliant with prior MHL standards in that USB data is transmitted via a transition-minimized differential signaling (TMDS) channel 131 for transmitting A/V data using bidirectional time division multiplexed (TDM) scheme instead of using eCBUS 132, as described below in detail with reference to FIG. 2.

The eCBUS 132 is bi-directional and full duplex such that the source device 110 and sink device 120 can transfer control data simultaneously. Control data transmitted over the eCBUS 140 can include, among others, display data channel (DDC) commands, enhanced display identification data (EDID) data, and content protection codes. Additionally, the eCBUS 132 may also carry clock data from the source device 110 to the sink device 120. Although eCBUS 132 is full duplex, the transmission speed of eCBUS 132 is slower than TMDS channel 131. Embodiments described herein use TMDS channel 131 capable of high-speed communication instead of eCBUS 132 to transmit USB data of high bitrate.

The source device 110 herein refers to a device that sends A/V data to other devices (e.g., sink device 120). The source device 110 may include, but is not limited to, a personal computer (e.g. tablet, notebook, ultrabook, laptop and desktop), a camcorder, a smart phone, a video game console, a television, and a set-top box.

The source device 110 may include, among other components, a transmitter 111, a receiver 112, a buffer 113, a control logic 114, a phase lock loop (PLL) 116, and a clock 115. The transmitter 111 is hardware, firmware, software or a combination thereof for encoding and sending packets of A/V and USB data from the source device 110 to a sink device 120 via a TMDS channel 131 of the multimedia link 130 and control data through an eCBUS 132 of the multimedia link 130. The transmitter 111 may perform functions such as buffering, digital-to-analog conversion, amplification, pre-driver logic and driver logic. Additionally, the transmitter 111 may receive buffered USB data from the buffer 113 for inclusion in an A/V stream sent to the sink device 120.

The receiver 112 is hardware, firmware, software or a combination thereof for decoding USB data received from the sink device 120 via the TMDS channel 131 and control data through an eCBUS 132. The receiver 112 receives USB data over the TMDS channel 131, for example, in a video data packet or a data island packet pursuant to the MHL standard. The receiver 112 may perform functions such as buffering, analog-to-digital conversion, filtering, mixing and amplification.

The buffer 113 is hardware, firmware, software or a combination thereof for accumulating data for sending via the transmitter 111 to the sink device 120. The buffer 113 may be a first in, first out (FIFO) buffer. The buffer 113 may include any of a variety of one or more circuit elements to provide a high output impedance path to the transmitter 111. The buffer 113 circuitry may include a diode, amplifier and/or one or more transistors. USB buffering performed in the FIFO buffer 113 is described below in detail with reference to FIG. 5.

The control logic 114 is hardware, firmware, software or a combination thereof for generating data to be sent over the eCBUS 132 or TMDS channel 131 or processing data received via eCBUS 132 or TMDS channel 131. In one embodiment, control logic 114 detects whether the sink device 120 supports transmission of USB data over the TMDS channel 131. Based on such detection, control logic 114 may signal the transmitter 111 or receiver 112 to send or receive USB data via the TMDS channel 131.

The clock 115, in conjunction with a phase lock loop 116, performs the following functions: (i) provide timing and synchronization for internal components of the source device 110, (ii) provide timing and synchronization of data transmission over the TMDS 131 channel and eCBUS 132, and (iii) provide timing values for Time Division Multiplexing (TDM) windows in TMDS 131 channel.

The sink device 120 refers to a device for receiving A/V data from a source device. The sink device 120 may include, but are not limited to, television, monitor, and smart phone display unit. The sink device 120 may include, among other components, a transmitter 121, a receiver 122, a buffer 123, control logic 124, a phase lock loop (PLL) 126, and a clock 125. The functions and structures of these components in the sink device 120 are substantially the same as counterpart components of the source device 110 except that (i) transmitter 121 sends only USB data to the source device 110 over the TMDS channel 131 (ii) receiver 122 receives both USB data and A/V data over the TMDS channel 131 (iii) the tracking of a predetermined amount of time is done in the source device. The detailed description of these components is omitted herein for the sake of brevity.

Scheme for Multiplexing of USB Data in A/V Stream

Figure 2:
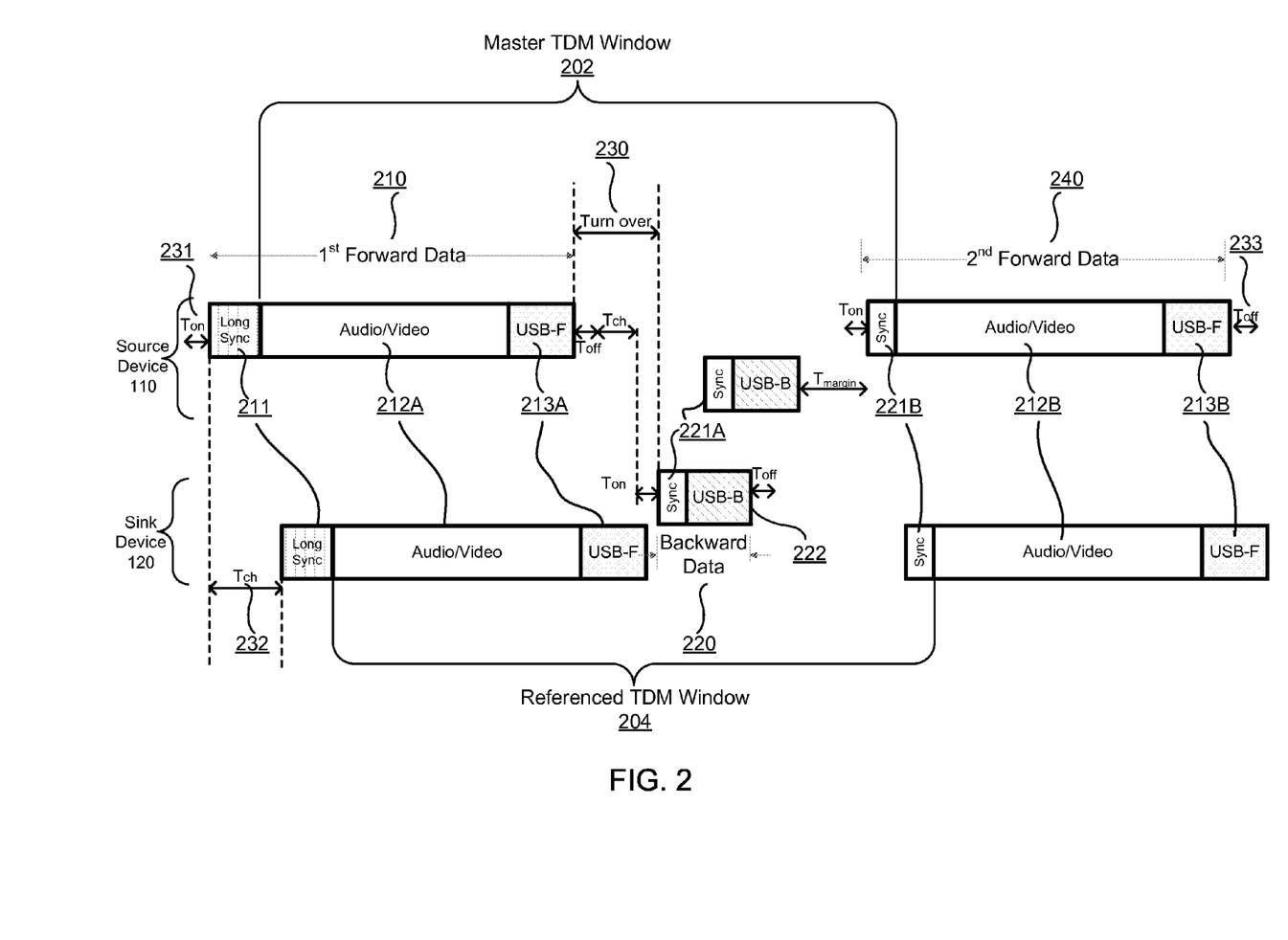
FIG. 2 is a timing diagram illustrating a timing sequence of bidirectional USB data transmission over a multimedia link, according to one embodiment.

FIG. 2 is a timing diagram illustrating a bidirectional transmission of USB data within an A/V stream, according to one embodiment. FIG. 2 illustrates a transmission of an initial first forward data packet 210 from a source device 110, reception of the initial first forward data packet 210 by the sink device 120, a transmission of a backward data packet 220 by the sink device 120 and reception of the backward data packet 220 by the source device 110. Forward data packets transmitted after the initial first data packet 210 has the same format as second forward data packet 240.

The bidirectional transmission of USB data multiplexed within an A/V stream is synchronized using TDM windows. A TDM window is a recurrent time period during which forward data packets and backward data packets 220 may be transmitted in a half-duplex time division multiplexed manner. Each TDM window provides timing parameters for USB data transmission and reception to avoid data packet collision on a same TMDS channel 131. Each of the source device 110 and the sink device 120 maintain separate, independent and unaligned TDM windows.

The TDM windows include master TDM window 202 and referenced TDM window 204. The master TDM window 202 is used by the source device 110 to determine the end of incoming backward data packets 220 sent from the sink device 120. The time period of the master TDM window 202 may remain constant throughout data transmission. A referenced TDM window 204 is used by the sink device 120 to determine the end of incoming forward data packets sent from the source device 110. The time period of the referenced TDM window 204 may be of variable length, readjusting at the arrival of forward data packets.

The first forward data packet 210 includes a long synchronization signal 211, audio/video 212A data and USB-forward data 213A. The long synchronization signal 211 is a synchronization signal that initializes communication between the source device 110 and the sink device 120 at the beginning of TDM link establishment. The long synchronization signal 211 prepares the sink device 120 for the reception of A/V data 212A and USB-forward data 213A by aligning symbol boundaries of the long synchronization signal 211. The sink device 120 starts clock and data tracking for the first forward data packet 210 based on the long synchronization signal 211. Additionally, the sink device 120 starts its referenced TDM window 204 when the long synchronization signal 211 ends. In the first forward data 210 packet, A/V data 212A and USB-forward data 213A follow the long synchronization 211 signal. The A/V data 212A includes audio data, video pixels data, and auxiliary data. The byte sizes of the A/V data 212A vary depending on video resolution size. USB-forward data 213A, for example, includes 18 bytes of data that complies with the USB standard. The long synchronization signal 211, in one embodiment, may have a length of eight bytes.

The backward data packet 220 includes a short synchronization 221A signal and USB-backward data 222. The short synchronization 221A is shorter than the long synchronization signal 211. In one embodiment, the short synchronization signal 221A may have a length of five bytes. The backward data packet 220 is transmitted from the sink 120 device to the source device 110 between forward data packets. The short synchronization signal 221A includes character symbol data used to align symbol boundaries and start clock and data tracking for the USB-backward data 222. It is distinguished from the long synchronization 211 in its shorter byte length and it is not required to initialize communication between devices. Additionally, the end of synchronization 221 data is used, by both devices to start their corresponding TDM windows. USB-backward data 222 includes of 18 bytes data that complies with the USB standard.

The second forward data packet 240 is similar to the first forward data 210 except that the second forward data includes a shorter synchronization signal 221B. The shorter synchronization signal 221B is substantially the same in function and structure as the short synchronization signal 221A in the backward data packet 220.

FIG. 2 also illustrates latency that occurs during bidirectional transmission of USB data multiplexed within an A/V stream. Prior to the transmission of forward or backward data packets, the corresponding device transmitter 111 is turned on for a period of time $T_{on}$. After the data packet is sent the transmitter 111 is turned off for a period of time $T_{off}$. A channel delay $T_{ch}$ is the time period occurring between the transmissions of a data packet from a transmitter 111 of a source device 110 to its reception by a receiver 122 of a sink device 120. The delay $T_{ch}$ is caused by the time need for a data packet to traverse the TMDS Channel 131. The summation of time between the turn-on time period $T_{on}$, turn-off time period $T_{off}$, and channel delay time period $T_{ch}$ is the turn over time 230. $T_{margin}$ represents a time period between the end of a backward data packet 220 and the beginning of a second forward data packet 240.

Although the communication is initiated by sending the first forward data 210 at the source device in the embodiment of FIG. 2, the sink device 120 may initiate the communication by sending backward data in other embodiments. In embodiments where the communication is initiated by sending the backward data, the long synchronization signal may be included in the included in the backward data instead of the forward data.

Example Structure of Data in A/V Stream

Figure 3:
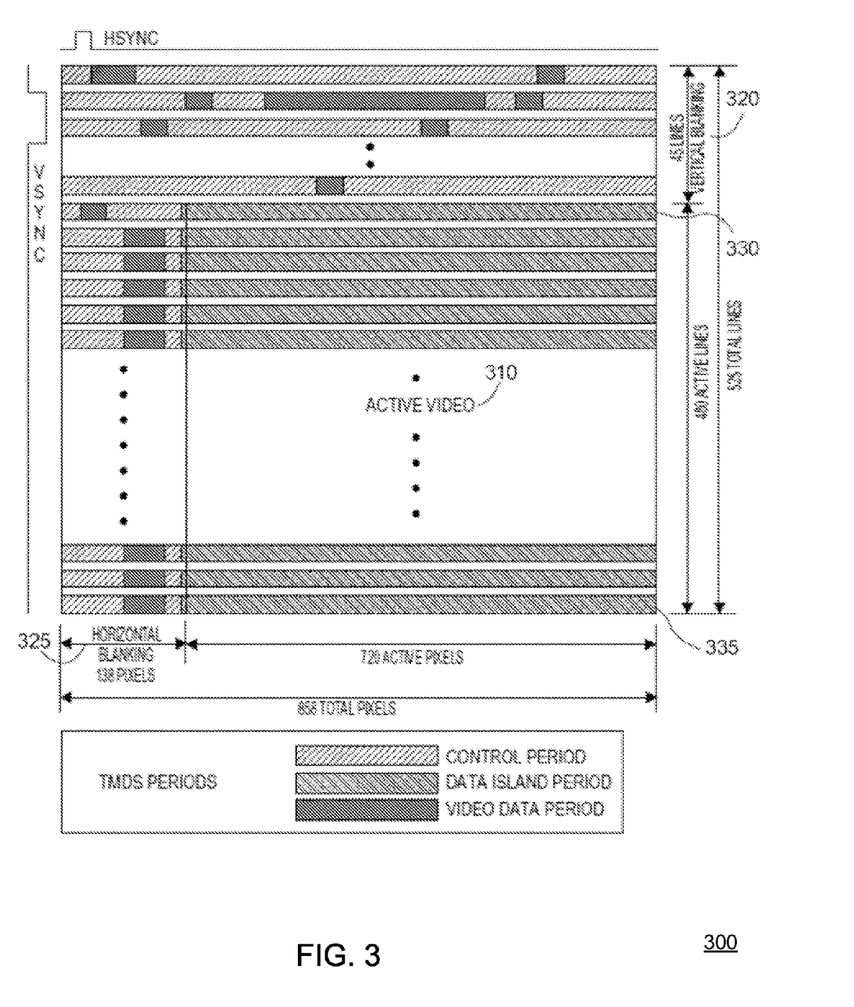
FIG. 3 is a diagram illustrating a frame of Audio/Video (A/V) data transmitted over a first physical channel, according to one embodiment.

FIG. 3 is a diagram illustrating a frame of data transmitted over a TMDS channel, according to one embodiment. A data frame 300 includes active video data 310 (480 lines of active video data in this particular example), as well as a vertical blanking period 320 between periods of active video data and horizontal blanking periods between lines of video data 325 (each line including 720 active pixels). The particular number of lines and pixels is dependent on the type and resolution of a video image. In some embodiments, in order to synchronize auxiliary data (e.g., character data) with the video data 325, the auxiliary data is encoded within the video data. In some embodiments, the auxiliary data is encoded by modifying the color space of a portion of the video data 310 to generate unused bits for the encoding of the auxiliary data.

In some embodiments, because the modification of the color space of the portion of video data used to encode the auxiliary data results in degradation of the video data, the portion of video data is chosen to reduce visual impact. In some embodiments, the portion of video data is chosen to be at a beginning or end (or both) of the video data such that the image display is affected only at, for example, the top or bottom (or both) of the image. In this illustration, the portion of video data utilized for encoding of auxiliary data may be a first line or lines 330 of the video data 310 or a last line or lines 335 of the video data such that the portion of the resulting image is affected only at the top of the image, the bottom of the image, or both the top and the bottom of the image. In some embodiments, the portion may also be encoded at a right or left edge of the image, with character data being encoded in multiple lines of the video data 310.

In some embodiments, a reduction image quality because of the encoding of auxiliary data is transitory because there is a need to convert the color space or reallocate bits only when sending new auxiliary data. With the high bandwidth of the video data, auxiliary data such as closed captions may be sent in a single frame while conventional systems required multiple frames. Thus, in one example, a color space conversion may interrupt only a single frame per second, which is likely an imperceptible change to the viewer.

Example USB Buffering

Figure 4:
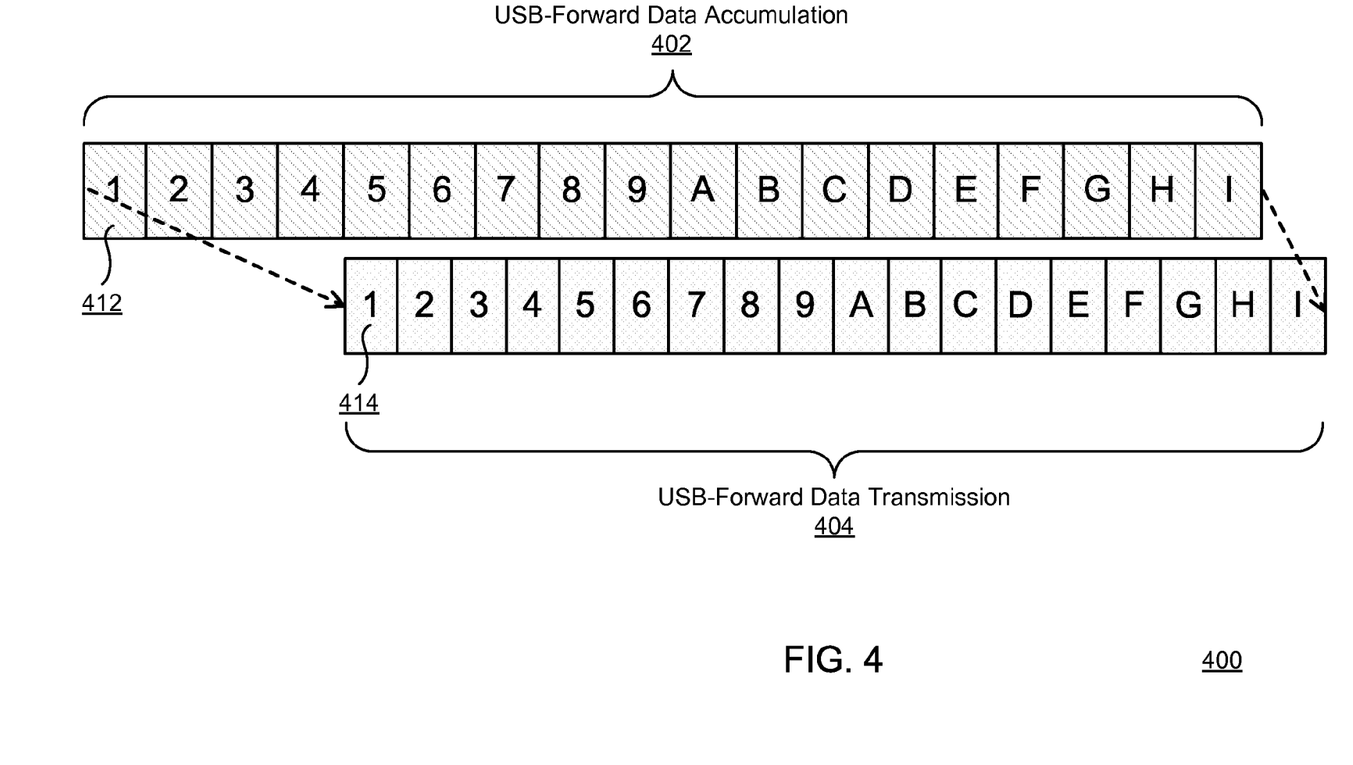
FIG. 4 is a diagram illustrating buffering of a predetermined amount of USB data before assembling and sending the USB data, according to one embodiment.

FIG. 4 is a diagram illustrating a buffering of USB-forward data for insertion into an A/V data stream, according to one embodiment. To include bi-directionally transmitted USB data of a slow rate (e.g., 600 Mbps) within A/V data stream of a high rate (e.g., 6.0 Gbps), buffering of the USB data is performed. Further, sending an empty USB data packet (null-USB packets) is not permitted under the USB standard. Hence, USB data is buffered as integer packets of one byte prior to transmission to account for a higher data rate of A/V data stream. The one byte USB data packets are then transmitted in each TDM window time period. USB data in both the forward and backward direction are buffered in the buffers 113, 123 before being evenly distributed through TDM windows over the TMDS channel 131.

In one embodiment, the data packet of USB-forward data 213 and USB-backward data 221 are both 18 bytes in size. However, USB-forward data 213 and USB-backward data 221 are buffered at different rates to account for the presence or absence of A/V data 212. A USB-forward data 213 byte is sent as part of a USB-forward data transmission 404 that occurs every 11 TDM time slots 414. The USB-forward data 213 is transferred from the buffer 113 for transmission when at least four bytes have been. If a TDM time period passes before buffering begins, too much latency is added to the USB data transmission. If less than 4 bytes are buffered or buffering occurs during the middle of a TDM time period, not enough USB-forward data will be available to send through a TDM time slot. A USB-backward data byte is transmitted for every time slot because there is no A/V data to package with the USB-backward data 222 and transmission occurs at much faster rates. Additionally, 18 bytes of USB-backward data are accumulated in the buffer 123 prior to the transmission.

Example Process for Bidirectional Transmission of USB Data

Figure 5:
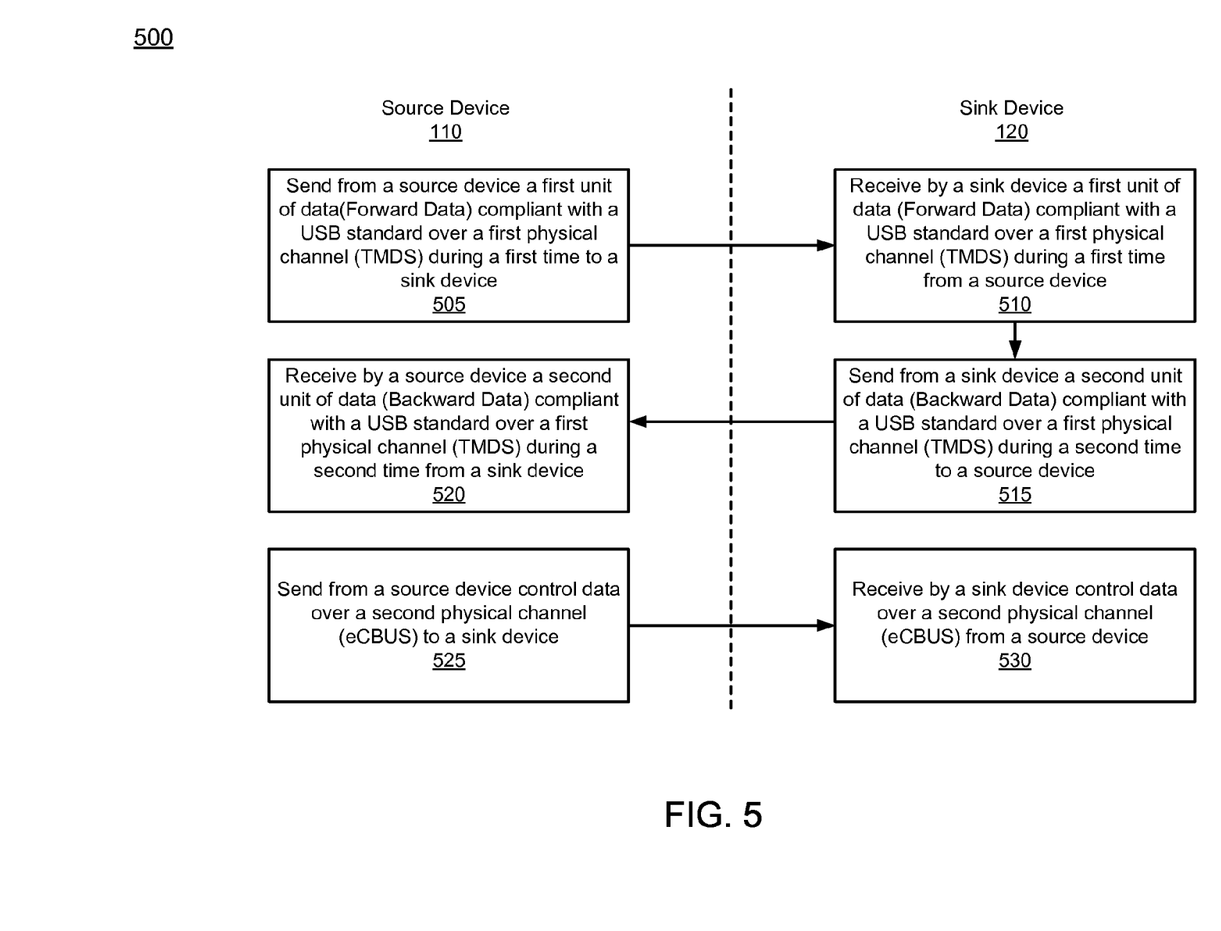
FIG. 5 is a transactional diagram illustrating a method for bidirectional transmission of USB data over an A/V data channel of a multimedia link, according to one embodiment.

FIG. 5 is a transactional diagram illustrating a method for the bidirectional exchange USB data in an A/V data channel, according to one embodiment. The source device 110 sends 505 a first forward data packet 210 over a TMDS channel 131 of a multimedia link 130 during a first time to a sink device 120. At the start of the first time the source device 110 enters a transmission state.

The source device 110 then transitions to a receive state after sending the first forward data packet 210 and prior to a second time. In the receive state the source device 110 turns on a counter and waits for a synchronization 221A signal send by the sink device 120.

During the first time the sink device 120 waits for a long synchronization 211 before transitioning into a receive state and starting a referenced TDM window 204. The sink device 120 receives 510 the first forward data packet 210 over the TMDS channel 131 of the multimedia link 130 from a source device 110. Based upon the referenced TDM window 204, the sink device 120 transitions to transmission state.

The sink device 120 sends 515 a backward data packet 220 over a TMDS channel 131 of a multimedia link 130 during a second time to a source device 110. The sink device 120 returns to the receive state and waits for the next synchronization 221B signal. If no synchronization 221A is received during a second time, the source device 110 waits for the master TDM window 202 to expire before returning to the transition state. If the synchronization 221A is received, the source device 110 receives 520 a backward data packet 220 over a TMDS channel 131 of a multimedia link 130 during a second time from the sink device 120.

Control data is sent 525 from the source device over an eCBUS channel 132 to a sink device 120, independent from forward and backward data sent over the TMDS channel 131. The control data is received 530 by a sink device 120 over the eCBUS channel 132 from a source device 110.

In an alternative embodiment, the sink device 120 initiates data transmission while using the master TDM window 202 to control data exchange timing. At the start of the first time the sink device 120 enters a transmission state. The sink device 120 sends 505 a backward data packet 220 over a TMDS channel 131 of a multimedia link 130 during a first time to a source device 110.

The sink device 120 then transitions to a receive state after sending the backward data packet 220 and prior to a second time. In the receive state the sink device 120 turns on a counter and waits for a synchronization 221B signal send by the source device 110.

During the first time the source device 110 waits to receive a long synchronization 211 before transitioning into a receive state and starting a referenced TDM window 204. The source device 110 receives 510 the backward packet 210 over the TMDS channel 131 of the multimedia link 130 from the sink device 120. Based upon the referenced TDM window 204, the source device 110 transitions to transmission state.

The source device 110 sends 515 a second forward packet 240 over a TMDS channel 131 of a multimedia link 130 during a second time to a sink device 120. The source device 110 returns to the receive state and waits for the next synchronization 221A signal. If no synchronization 221B is received during a second time, the sink device 120 waits for its master TDM window 202 to expire before returning to the transition state. If the synchronization 221B is received, the sink device 120 receives 520 a second forward data packet 220 over a TMDS channel 131 of a multimedia link 130 during a second time from the source device 110

Computing Machine Architecture

Figure 6:
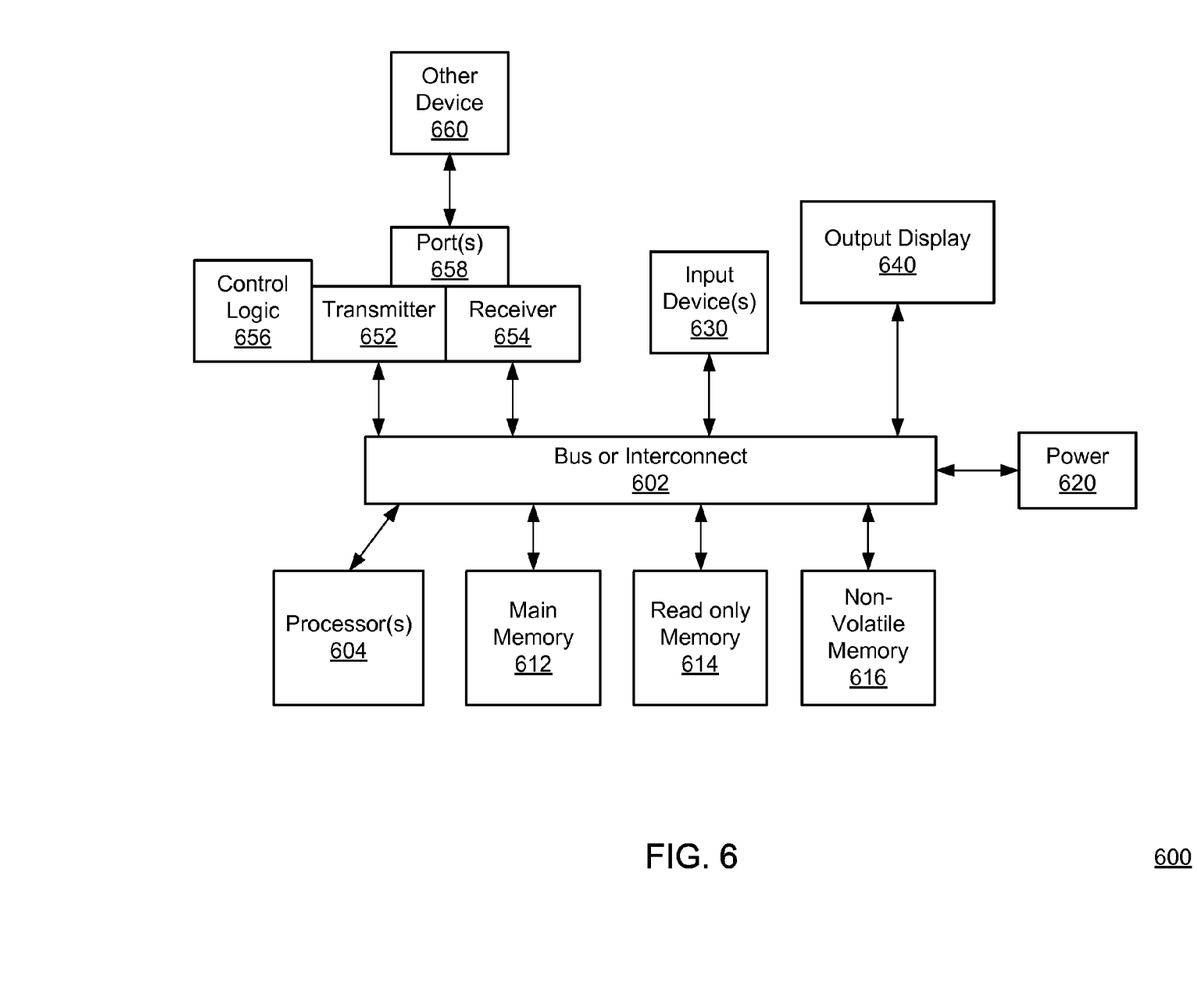
FIG. 6 is a block diagram illustrating an apparatus or system for bidirectional transmission of USB data over an A/V data channel of a multimedia link, according to one embodiment

Figure (FIG. 6) is a block diagram illustrating an apparatus or system for transmitting or receiving USB data encoded within an audio/video (A/V) data stream, according to one embodiment. An apparatus or system 600 (referred to here generally as an apparatus) comprises an interconnect or crossbar 602 or other communication means for transmission of data. The apparatus 600 may include a processing means such as one or more processor(s) 604 coupled with the interconnect 602 for processing information. The processor(s) 604 may comprise one or more physical processors and one or more logical processors. The interconnect 602 is illustrated as a single interconnect for simplicity, but may represent multiple different interconnects or buses and the component connections to such interconnects may vary. The interconnect 602 shown in FIG. 6 is an abstraction that represents any one or more separate physical buses, point-to-point connections, or both connected by appropriate bridges, adapters, or controllers.

In some embodiments, the system 600 further comprises a random access memory (RAM) or other dynamic storage device or element as a main memory 612 for storing information and instructions to be executed by the processor(s) 604. In some embodiments, main memory 612 may include active storage of applications including a browser application for using in network browsing activities by a user of the system 600. In some embodiments, main memory 612 of the system 600 may include certain registers or other special purpose memory.

The system 600 also may comprise a read only memory (ROM) 614 or other static storage device for storing static information and instructions for the processors 604. The apparatus 600 may include one or more non-volatile memory elements 616 for the storage of certain elements, including, for example, flash memory and a hard disk or solid-state drive.

One or more transmitters 652 or receivers 654 may also be coupled to the interconnect 602. In some embodiments, the transmitters 652 or receivers 654 may include one or more ports 658 for the connection of other devices 660, such as the illustrated. In some embodiments, the system 600 includes control logic 656, where the control logic 656 provides for handling of the transmission or reception of USB data, where the handling of such data includes encoding the USB data into video data for transmission or extracting the USB data from received data.

The system 600 may also be coupled via the interconnect 602 to an output display 640. In some embodiments, the display 640 may include a liquid crystal display (LCD) or any other display technology, for displaying information or content to a user. In some environments, the display 640 may include a touch-screen that is also utilized as at least a part of an input device 630. In some environments, the display 640 may be or may include an audio device, such as a speaker for providing audio information.

The system 600 may also include a power device 620, which may comprise a power supply, a battery, a solar cell, a fuel cell, or other system or device for providing or generating power. The power provided by the power device or system 620 may be distributed as required to elements of the system 600.

While particular embodiments and applications have been illustrated and described, it is to be understood that the disclosed embodiments are not limited to the precise construction and components disclosed herein. Various modifications, changes and variations, may be made in the arrangement, operation and details of the method and apparatus disclosed herein.

What is claimed is:

1. A method of transmitting data over a multimedia link, comprising:
over a first physical channel of the multimedia link:
sending forward units of data from a source device to a sink device during one or more first time periods, the forward units of data comprising video data and forward data compliant with a first standard comprising a universal serial bus (USB) standard and different from a standard of the video data;
receiving backward units of data at the source device from the sink device during one or more second time periods, the backward units of data comprising backward data compliant with the first standard; and
over a second physical channel of the multimedia link distinct from the first physical channel:
sending control data from the source device to the sink device.

2. The method of claim 1, further comprising sending a first synchronization signal of a first length after sending a first forward unit of data of the forward units of data, and before sending another forward unit of data from the source device.

3. The method of claim 2, further comprising sending a second synchronization signal of a second length longer than the first synchronization to initialize communication over the first physical channel before sending the first forward unit of data.

4. The method of claim 1, further comprising detecting, by the source device, a first synchronization signal of a first length for a predetermined amount of time after sending a first forward unit of data of the forward units of data, the first synchronization signal received at the source device before receiving a first backward unit of data of the backward units of data.

5. The method of claim 4, further comprising aligning a boundary of a symbol in the first backward unit of data using the first synchronization signal.

6. The method of claim 4, wherein the first time and the second time are separated by at least a predetermined amount of turnover time (ToT) greater than a sum of a turn-off time of a driver of the source device for communicating over the first physical channel, a turn-on time of a driver of the sink device for communicating over the first physical channel, and a channel delay time.

7. The method of claim 4, further comprising buffering a predetermined amount of the forward data before assembling and sending a first forward unit of data of the forward units of data.

8. The method of claim 4, wherein the predetermined amount of time is tracked at the source device.

9. The method of claim 4, further comprising sending another first synchronization signal of the first length from the source device to the sink device after receiving the first backward unit of data and before sending another forward unit of data from the source device to the sink device, the other forward unit of data comprising data compliant with the first standard.

10. The method of claim 1, further comprising receiving control data from the sink device to the source device over the second physical channel of the multimedia link distinct from the first physical channel.

11. A method of transmitting data over a multimedia link, comprising:
over a first physical channel of the multimedia link:
receiving forward units of data from a source device by a sink device during one or more first time periods, the forward units of data comprising video data and forward communication data compliant with a first standard comprising a universal serial bus (USB) standard and different from a standard of the video data;

sending backward units of data from the sink device to the source device during one or more second time periods, the backward units of data comprising backward communication data compliant with the first standard; and over a second physical channel of the multimedia link distinct from the first physical channel:
receiving control data from the source device to the sink device.

12. The method of claim 11, further comprising receiving a first synchronization signal of a first length after receiving a first forward unit of data of the forward units of data, and before receiving a second forward unit of data from the source device.

13. The method of claim 12, further comprising detecting a second synchronization signal of a second length longer than the first synchronization to initialize communication over the first physical channel before receiving the first forward unit of data.

14. The method of claim 12, wherein the first time and the second time are separated by at least a predetermined amount of turnover time (ToT) greater than a sum of a turn-off time of a driver of the source device for communicating over the first physical channel and a turn-on time of a driver of the sink device for communicating over the first physical channel.

15. The method of claim 12, further comprising buffering a predetermined amount of the backward data before assembling and sending a first backward unit of data of the backward units of data.

16. The method of claim 12, further comprising receiving another first synchronization signal of the first length from the source device after sending a backward unit of data and before receiving another forward unit of data from the source device, the other forward unit of data comprising data compliant with the first standard.

17. The method of claim 11, further comprising aligning a boundary of a symbol in a first forward unit of data of the forward units of data using the first synchronization signal.

18. The method of claim 12, further comprising sending a first synchronization signal of a first length after receiving the first forward unit of data to cause the source device to receive the first synchronization signal within a predetermined amount of time after the source device sends the first forward unit of data.

19. The method of claim 18, wherein the source device tracks the predetermined amount of time in the source device.

20. The method of claim 11, further comprising sending control data from the sink device to the source device over the second physical channel of the multimedia link distinct from the first physical channel.

21. A source device for communicating data with a sink device over a multimedia link, comprising:

a transmitter coupled to a first physical channel of the multimedia link and configured to send forward units of data from the source device to the sink device over the first physical channel during one or more first time periods, the forward units of data comprising video data and forward data compliant with a first standard comprising a universal serial bus (USB) standard and different from a standard of the video data;

a receiver coupled to the first physical channel and configured to receive backward units of data at the source device from the sink device over the first physical channel during one or more second time periods, the backward units of data comprising backward data compliant with the first standard; and a control signal transceiver coupled to a second physical channel of the multimedia link distinct from the first physical channel and configured to at least send control data from the source device to the sink device over the second physical channel.

22. A non-transitory computer readable storage medium storing instructions thereon, the instructions representing a digital design of a circuit comprising:

a transmitter coupled to a first physical channel of the multimedia link and configured to send forward units of data from a source device to a sink device over the first physical channel during one or more first time periods, the forward units of data comprising video data and forward data compliant with a first standard comprising a universal serial bus (USB) standard and different from a standard of the video data;

a receiver coupled to the first physical channel and configured to receive backward units of data at the source device from the sink device over the first physical channel during one or more second time periods, the backward units of data comprising backward data compliant with the first standard; and a control signal transceiver coupled to a second physical channel of the multimedia link distinct from the first physical channel and configured to at least send control data from the source device to the sink device over the second physical channel.

* * * * *

UNITED STATES PATENT AND TRADEMARK OFFICE
CERTIFICATE OF CORRECTION

PATENT NO. : 9,852,103 B2  
APPLICATION NO. : 14/681992  
DATED : December 26, 2017  
INVENTOR(S) : Jun Hwan Yi et al.

Page 1 of 1

It is certified that error appears in the above-identified patent and that said Letters Patent is hereby corrected as shown below:

In the Claims

Column 10, Claim 3, Line 24, delete "first synchronization to" and insert --first synchronization signal to --.

Column 11, Claim 13, Line 20, delete "first synchronization to" and insert --first synchronization signal to --.

Signed and Sealed this
Seventeenth Day of July, 2018

Andrei Iancu
*Director of the United States Patent and Trademark Office*